Patented Jan. 1, 1929.

1,697,361

UNITED STATES PATENT OFFICE.

GEORG KALISCHER, OF FRANKFORT-ON-THE-MAIN, AND RUDOLF MÜLLER, OF MAIN-KUR, NEAR FRANKFORT-ON-THE-MAIN, GERMANY, ASSIGNORS TO GRASSELLI DYE-STUFF CORPORATION, OF NEW YORK, N. Y., A CORPORATION OF DELAWARE.

PROCESS FOR THE PRODUCTION OF VAT DYESTUFFS.

No Drawing. Application filed October 1, 1925, Serial No. 59,931, and in Germany November 12, 1924.

In Letters Patent 1,440,883 a process for the production of yellow vat dyestuffs is described, which consists in heating to elevated temperatures 2-methylanthraquinone with sulfur and such aromatic compounds which contain in their molecule the paradiamine-nucleus

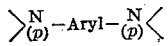

Now we have found that analogous dyestuffs are obtained if in this process the aromatic paradiamino compounds are replaced by a primary aromatic diamino compound containing a naphthalene nucleus of the formula:

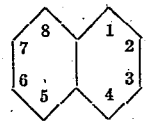

in which the 1 and 8 positions may be condensed by the residue of the formula:

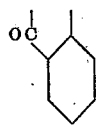

two hydrogen atoms belonging to different rings of the system being replaced by amino-groups. The process for the manufacture of the new dyestuffs is carried out in the same manner as indicated in Letters Patent 1,440,883. The shade of the dyestuffs thus obtained varies from yellow to orange.

Example 1.

A mixture of 44 kilos 2-methylanthraquinone and 16 kilos 1.5 naphthylenediamine are introduced whilst stirring into 200 kilos molten sulfur at a temperature of about 240–250° C. The molten mass is thereupon kept for 5–7 hours at the same temperature and then allowed to cool down. The product thus obtained is powdered and in order to free it from the excess of sulphur is then digested with a dissolving agent for sulfur, for instance by warming it with a solution of sodium sulfide. The dyestuffs thus obtained still contains brown coloring by-products. In order to remove them the dye-stuff is dissolved in about 10 parts concentrated sulfuric acid then heated for several hours to 100–120°, preferably with the addition of a small quantity of an acid oxidizing agent such as chromic-acid, nitrite of sodium etc. The solution thus obtained is thereupon precipitated with water, whereby it is obtained in a finely divided state. This paste is then further treated at 60–100° C. with a suitable alkaline oxidizing agent, as for instance with a solution of sodium hypochlorite until the impurities have been removed and a test dyeing yields a pure yellow shade.

The dyestuff in a pure state represents a yellow-brown powder very sparingly soluble in organic solvents, dissolving in concentrated sulfuric-acid with an orange color and dyeing cotton from a brown red vat reddish yellow shades fast to washing, chlorine and light.

Example 2.

When replacing the 16 kilos 1.5 naphthylenediamine used in Example 1 by 26 kilos diaminobenzanthrone obtainable by reducing the dinitrocompound of 268° C. melting point, obtainable by nitrating benzanthrone with a nitric acid of 87% strength according to Example 5 of British specification No. 12518/06 and working in the same manner as described in Example 1 a reddish brown powder is obtained dissolving in concentrated sulfuric acid with a yellowish red color and yielding with alkaline hydrosulfites a brown colored vat from which vegetable fibres are dyed brownish orange shades of very good fastness.

Having now particularly described and ascertained the nature of our said invention and in what manner the same is to be performed, we declare, that what we claim is:

1. Process for producing yellow to orange vat dyestuffs, which consists in heating to temperatures above 200° C. 2-methylanthraquinone with sulfur and a primary aromatic diamino compound, containing a naphthalene nucleus of the formula:

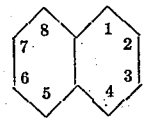

in which the 1 and 8 positions may be condensed by the residue of the formula:

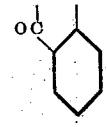

two hydrogen atoms belonging to different rings of the system being replaced by amino groups, and purifying the products thus obtained by treating them with alkaline oxidizing agents.

2. Process of producing yellow to orange vat dyestuffs, which consists in heating to temperatures above 200° C. 2-methylanthraquinone with sulfur and a primary aromatic diamino compound containing a naphthalene nucleus of the formula:

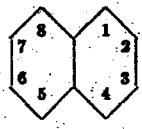

in which the 1 and 8 positions may be condensed by the residue of the formula:

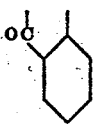

two hydrogen atoms belonging to different rings of the system being replaced by amino groups, substantially as described.

3. As new products the dyestuffs obtained by heating to elevated temperatures 2-methylanthraquinone with sulfur and a primary aromatic diamino compound containing a naphthalene nucleus of the formula:

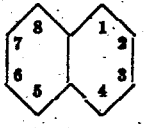

in which the 1 and 8 positions may be condensed by the residue of the formula:

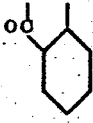

two hydrogen atoms belonging to different rings of the system being replaced by amino groups, and purifying the products thus obtained by treating them with alkaline oxidizing agents substantially as described, which dyestuffs are insoluble in water and in most organic solvents, soluble in concentrated sulfuric acid with an orange to reddish color and yield with alkaline hydrosulfites brown to red colored vats from which vegetable fibres are dyed yellowish to orange shades, fast to washing, chlorine and light, substantially as described.

4. Process of producing an orange vat dyestuff which consists in heating to temperatures above 200° C. 2-methylanthraquinone with sulfur and diaminobenzanthrone obtainable by reducing the dinitrocompound of 268° C. melting point and purifying the product thus obtained by treating it with an oxidizing agent, substantially as described.

5. As a new product the dyestuff which may be obtained by heating to elevated temperatures 2-methylanthraquinone with sulfur and diaminobenzanthrone obtainable by reducing the dinitrocompound of 268° C. melting point and purifying the product thus obtained by treating it with an oxidizing agent substantially as described, which dyestuff is insoluble in water and in most organic solvents, which dissolves in concentrated sulfuric acid with a yellowish red color and yields with alkaline hydrosulfites a brown colored vat from which vegetable fibres are dyed brownish orange shades fast to washing, chlorine and light, substantially as described.

In witness whereof we have hereunto signed our names this 18th day of September, 1925.

GEORG KALISCHER.
RUDOLF MÜLLER.